Sept. 14, 1965 D. C. HANNON 3,206,678

CIRCUIT FOR GENERATING A NARROW BAND SIGNAL FOR DIGITAL DATA TRANSMISSION OVER TELEPHONE LINES

Filed Dec. 28, 1962 4 Sheets-Sheet 1

INVENTOR
DONALD C. HANNON
BY William E.P. Boyle

ATTORNEY

INVENTOR
DONALD C. HANNON
BY William E. P. Bayly
ATTORNEY

INVENTOR
DONALD C. HANNON
BY William E. P. Bayly
ATTORNEY

INVENTOR
DONALD C. HANNON
BY William E.P. Bayly
ATTORNEY 3,206,678

CIRCUIT FOR GENERATING A NARROW BAND SIGNAL FOR DIGITAL DATA TRANSMISSION OVER TELEPHONE LINES

Donald Charles Hannon, Southampton, England, assignor to The Plessey Company Limited, Ilford, England, a British company Filed Dec. 28, 1962, Ser. No. 248,847
Claims priority, application Great Britain, Jan. 3, 1962, 225/62
5 Claims. (Cl. 325—163)

Figure 1:
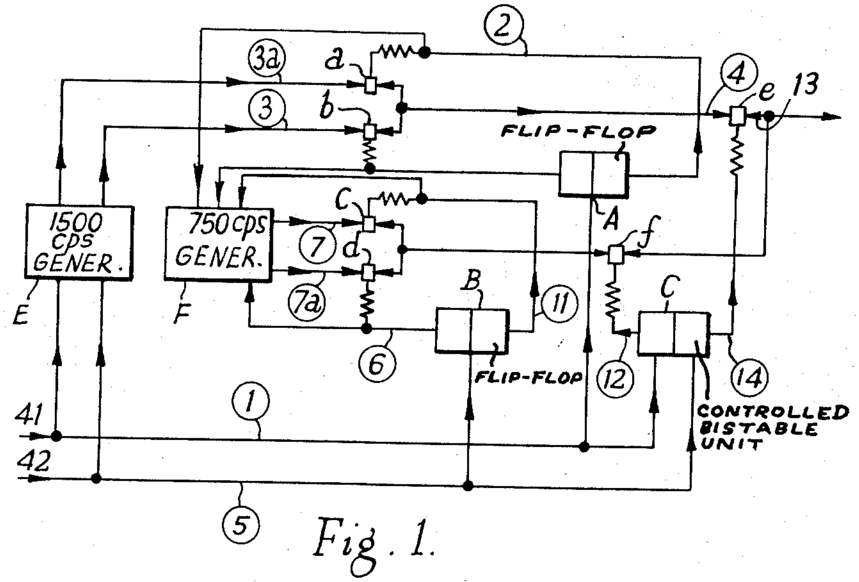

This invention relates to frequency-shift digital transmission systems of the kind in which two or more distinctive signals are represented by the transmission of oscillations of different frequencies during the relevant signal periods. Such systems are commonly used in telegraphy but may also be applied generally to the transmission of information in digital form, for example over voice-frequency links. It is an object of the invention to permit the transmission of the frequency-shift signals within a narrow band width. According to the invention this is achieved by incorporating in the transmitter means which ensure that at the moment of termination of the transmission of one signal and the simultaneous commencement of the transmission of another signal represented by a different frequency, the gradients of the voltage waveforms of the two signals at the point of transition are substantially equal, or in other words that the starting point, in the cycle of a signal of the frequency corresponding to the transmission of a digit, is so arranged that the gradient of the voltage waveform at this point is substantially the same as that at the finishing point of the signal corresponding to the transmission of the previous digit. The required phase relationship to bring this about may be achieved by predicting the rate and direction of change of voltage in the transmitted signals, the signals being derived by switching from continuously running oscillators of which the frequencies are phase-locked and harmonically related to each other and to the digit rate.

In the case of two signal frequencies, the two frequencies are preferably provided by phase-locked sine-wave generators one of which operates at a frequency which is an integral multiple of preferably, twice, the frequency of that of the other. In the latter case the signal period may be equal to the full cycle of the first and thus to a half-cycle of the second frequency, each generator being arranged to have two outputs with a phase shift of 180° between them and switching means being provided to select, when changing the signal, whichever output of the other generator has, at the moment of change, the appropriate phase having regard to the nature of the previous signal.

In a modified form of the apparatus according to the invention the higher of the two signal frequencies employed is only one half and the lower is one quarter of the pulse period frequency, means being provided for suppressing the emission of a further pulse at the end of the first pulse period following the emission of each pulse corresponding to the lower frequency so that each signal comprises one full half-cycle of the appropriate signal frequency. In this case the end of a complete half-cycle of the higher frequency, that is to say the end of a single signal at higher frequency, may coincide with any one of four conditions of the lower frequency, said conditions being mutually displaced in phase by 90°, and it is therefore necessary for the oscillator producing the lower frequency to have four outputs, so that at the end of each signal period of the higher frequency one of the outlets will be available to supply a signal which begins at substantially the same gradient as to magnitude and sign at which the previous signal terminates.

In the accompanying drawings—

Figure 2:
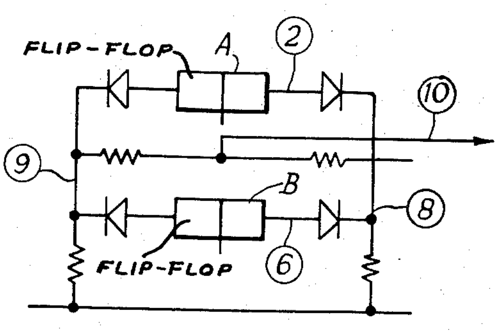
Figure 4:
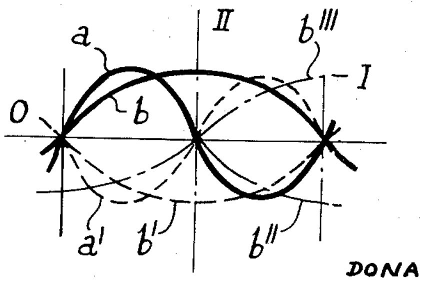
Figure 3:
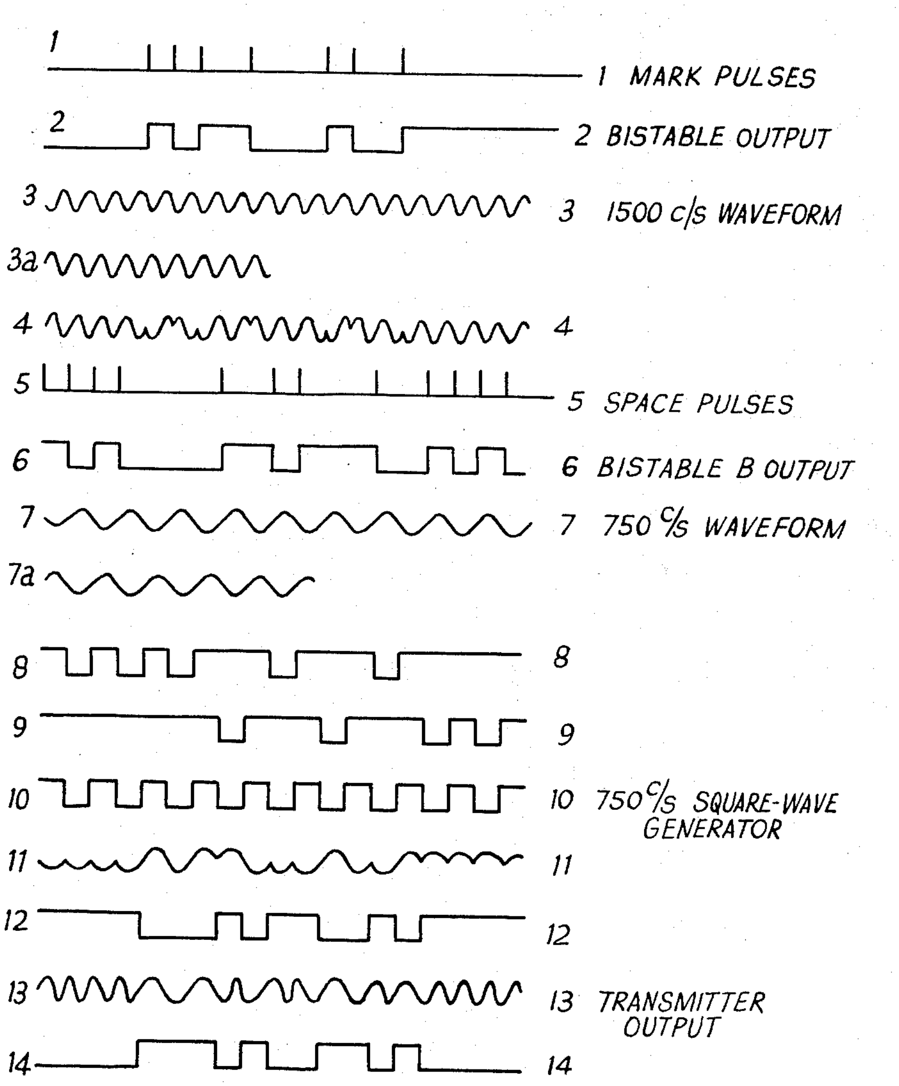
Figure 5:
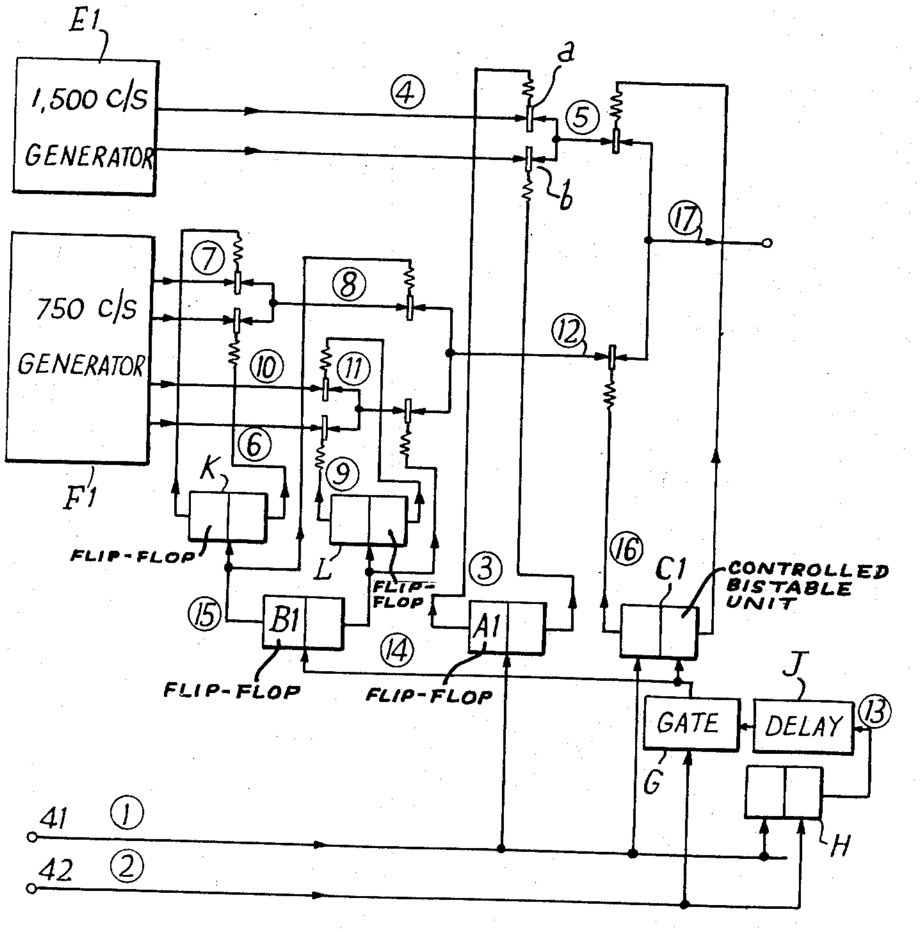
Figure 6:
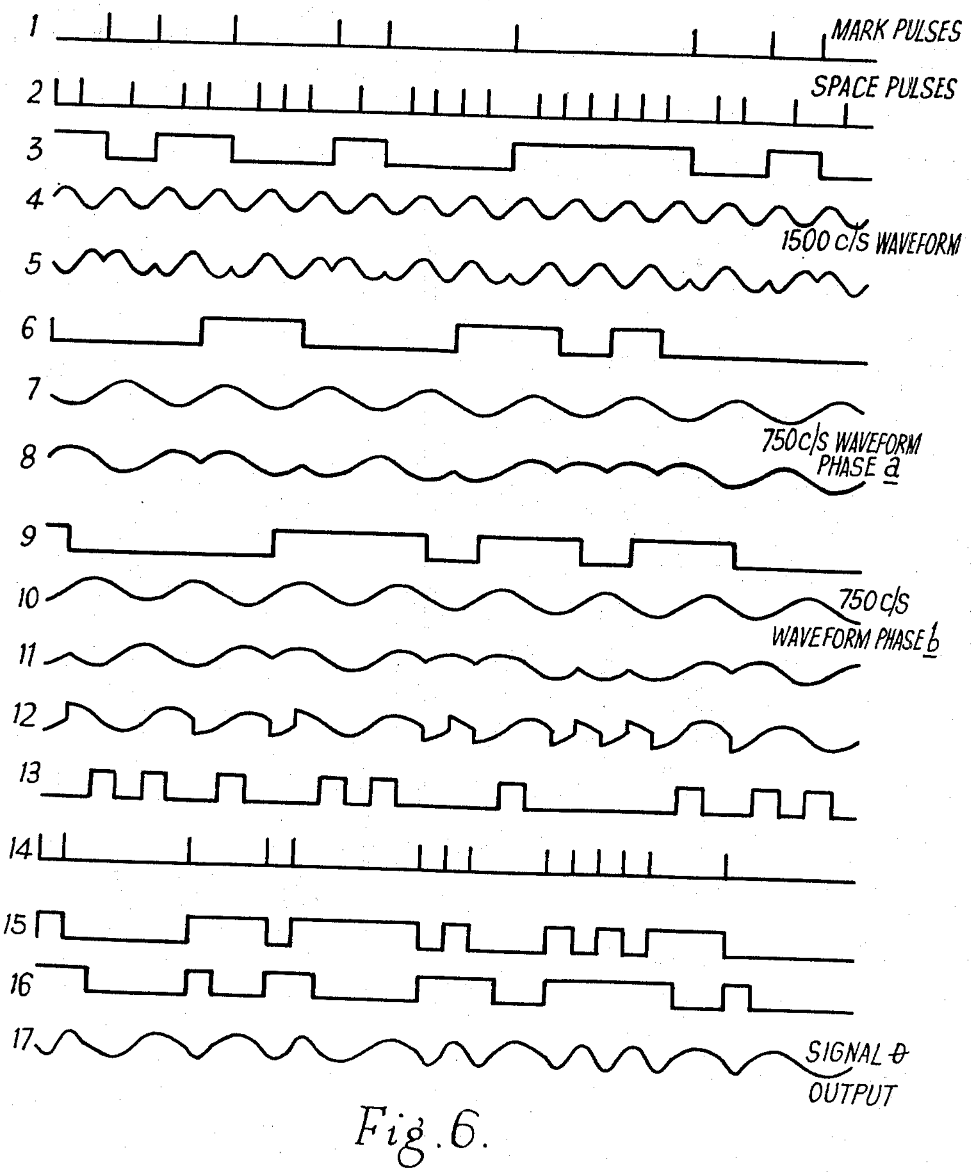

FIGURES 1 to 3 illustrate one embodiment of the invention FIGURE 1 being a block diagram of the frequency-shift transmitter, FIGURE 2 is a schematic circuit diagram of the generator for the lower frequency, FIGURE 3 is a set of waveforms appropriate to identified points in FIGURES 1 and 2, FIGURE 4 illustrates the various outputs of the individual oscillators provided, FIGURE 5 is a block diagram of a frequency-shift transmitter operating according to a modified system, in which the basic signal period is equal to one half-cycle of the shorter-wavelength signal, and FIGURE 6 is a set of waveforms appropriate to identified points in FIGURE 5.

Referring now first to FIGURE 1, in which the arrows represent the direction of signal flow, it will be seen that two inputs 41, 42, which in this case contain the mark and space pulses respectively of a telegraph signal having a constant number of element per code, are respectively applied to the input or control terminals of two flip-flop-type bistable circuits A and B. The mark and space pulses, which occur at a combined rate of 1500 pulses per second, are also jointly applied to a 1500 c./s. sine-wave generator E, which has two outputs displaced in phase by 180°.

The outputs from the bistable circuits A and B are combined in the manner indicated in FIGURE 2 to provide a 750 c./s. square-wave output which is locked in phase in relation to the input to the generator E, and which is used to drive a 750 c./s. sine-wave generator F, which again has two outputs displaced in phase by 180°.

FIGURE 2 enlarges on the arrangement producing the 750 c./s. square-wave input for generator F in FIGURE 1. It shows a suitable arrangement for combining the outputs of bistable circuits A and B to produce a 750 c./s. square-wave suitable for producing a 750 c./s. sine-wave which has a predetermined phase relation to the first space pulse received.

The reason why each generator E and F is provided with two mutually inverted outputs will become clear by reference to FIGURE 4 which shows a 1500 c.p.s. waveform *a* and a 750 c.p.s. waveform *b* both having the same original O and similar initial gradients. At point I, which corresponds to the end of one signal-repetition period from point O, both waveforms have returned to zero value, but while their voltages are equal, their voltage gradients are mutually reversed. The diagram further shows a waveform *a'*, which like waveform *a* has 1500 cycles-per-second and passes through zero at point O, but which is inverted relative to waveform *a*, and also a second 750 cycles-per-second waveform *b'* which is similarly inverted relative to waveform *b*; it will be appreciated that at point I, i.e. at the end of the first signal-repetition period from O, waveform *b'* when passing through zero voltage, has a voltage gradient of the same sign and similar magnitude as waveform *a*, while conversely waveform *a'* has a gradient of the same sign and of similar magnitude to that of waveform *b*. In other words, if the signal in the period from O to I corresponds to waveform *a*, at 1500 cycles-per-second, (space signal) and a change-over is to be effected at point I to a mark signal of 750 cycles-per-second, a transition of the kind contemplated by the present invention will only be achieved if the mark signal beginning at point I is supplied from an output supplying the waveform *b'* rather than the waveform *b*, while if two space pulses follow each other before a mark pulse is required, the waveform *b* will have completed a full cycle from point O and will thus have a gradient of the same sign to that of waveform $a$ at the same point, so that in that case waveform $b$ and not $b'$ must be chosen for a smooth transition from waveform $a$. For reasons which will now be evident, the converse is also true, that is to say if the waveform $b$ is transmitted from point O to point I and a change-over to 1500 cycles-per-second is required at that point, the waveform $a'$ and not the waveform $a$ must be chosen, while if two mark signals follow each other from point O, transition at the end of the second mark signal to a space signal requires the use of the waveform $a$ and not of the waveform $a'$.

Referring now again to FIGURE 1, the mutually inverted 1500 c./s. outputs from the generator E are respectively fed to a pair of transistor gates $a$ and $b$, which are rendered alternately conducting by output signals from the bistable unit A. The mutually inverted 750 c./s. outputs from the generator F are similarly fed to a pair of transistor gates $c$ and $d$ which are rendered alternately conducting by the outputs from the bistable unit B.

A choice between an output of 1500 c./s. from the generator E or one of 750 c./s. from the generator F is made by a pair of signal-selection transistor gates $e$ and $f$, which are controlled by an input-controlled bistable unit C. This last-mentioned bistable unit has two inputs, one fed with mark pulses and one with space pulses and operates in such a manner that the incidence of a mark pulse results in the gate $f$ being rendered conducting, while a space pulse results in the gate $e$ being rendered conducting.

FIGURE 3 illustrates waveforms appearing at various points of the illustrated circuit, corresponding points and waveforms being designated with identical numbers.

The operation of the circuit will now be traced back from the output towards the input. As will be seen from waveform 13 in FIGURE 3, the output consists of one or other of two frequencies, there being always a substantially smooth transition from one to the other due to the construction of the apparatus. The frequency which is transmitted during each signal period is determined by whether the gate $e$ or the gate $f$ is conducting, and this in turn depends on the condition of the input-controlled bistable unit C, which is controlled according to the occurrence of a mark pulse or of a space pulse in the input, while the choice between two phases mutually displaced by 180° is effected by the flip-flop bistable units A and B, which respectively control the phase of the signals fed to the output control gates $e$ and $f$ and which are respectively controlled by mark and space pulses. When, for example, a space pulse causes the output control gate $e$ to conduct, it is at the same time fed to the bistable flip-flop unit B to change the phase, by means of the gates $c$ and $d$, of any mark signal that may be fed to the other output-control gate $f$ in case a mark signal is required during the next signal period. Thus every mark pulse causes a change of phase in the space signal, appearing at point 11, and every space pulse causes a change of phase in the mark signal appearing at point 4. In this way, provided there is initially a correct phase relationship between the outputs of the generators E and F, a smooth transition from one frequency to the other will always take place in the output, and this correct initial relationship is ensured by the construction of the 750 c.p.s. generator as shown in FIGURE 2. The detector in a receiver supplied with the transmitter output multiplies the received waveform with each of the two alternative expected waveforms, and integrates the two products over the digit period before sampling the two by a short pulse which is so arranged that one received frequency produces a pulse at one of two outputs and the other received frequency produces a pulse on the other output.

While the system described with reference to FIGURES 1 to 3 operates with a constant pulse rate, a system will now be described with reference to FIGURES 4 to 6 in which for a given pair of signal frequencies the pulse rate may be increased or conversely lower signal frequencies may be employed for a given pulse rate by making the basic or shortest signal period equal to one half period of the higher one of the signal frequencies employed. The requirement of reliable identification of the signals in a receiver involves in this case the necessity of permitting the lower of the two frequencies when employed to persist over two basic signal periods so as to transmit a full half-wave thereof, and in order to maintain the continuity of the pulse sequence supplied to the local generator for the highest frequencies, it is convenient to arrange for an additional pulse corresponding to the higher one of the frequencies to be transmitted at the end of the first basic signal period after the beginning of the transmission of a pulse producing a signal of the lower frequency, and to make arrangements in the transmitter for rendering this pulse ineffective for the further progress of the transmission.

Referring now once more to FIGURE 4, a vertical line marked with II, has been drawn at the end of the first half-cycle of the waveform $a$. Since in the system now contemplated the higher of the two signal frequencies is equal to one half of the basic signal repetition frequency, the lower signal frequency, which is one half of the higher signal frequency, is one quarter of the signal repetition frequency. Beginning again from point O, and assuming that in a first signal period from O to II a space signal $a$ is transmitted, it will be seen that this signal ends with a negative gradient at zero voltage, while waveforms $b$ and $b'$ which commence at point O have respectively a positive and a negative voltage value and have both zero gradient. If two space pulses follow each other, the condition at point I is reached, at which waveform $a$ has a positive gradient at zero voltage and waveform $b$ a negative gradient at zero voltage. At point I waveform $b'$ has a positive gradient at zero voltage, similarly to waveform $a$ so that in that case waveform $b'$ would be suitable for a smooth transition. In order however to permit a smooth transition from waveform $a$ to a $b$-type waveform at point II, or in fact at the end of any odd number of consecutive signal periods in which waveform $a$ has been transmitted from point O, it is necessary to provide the 750 c.p.s. generator with two further outputs which are displaced relative to output $b$ by 90° in opposite directions, as indicated in FIGURE 4 at $b''$, and $b'''$, the former being available for continuous transition at the end of a single signal period (line II) (or 5, 9 etc. signal periods) of waveform $a$, and the latter being available for use after 3 (7, 11) etc. successive basic signal periods in which waveform $a$ is transmitted.

Referring now to FIGURE 5, it may be assumed that the 1500 cycles-per-second generator E1 is driven jointly by mark pulses on line 41 and space pulses on line 42 somewhat similarly as in the case of FIGURE 1 and that the 750 cycles-per-second generator F1 is driven by derivative pulses in such manner as to produce two pairs of outputs respectively including output 7 and output 10, which are displaced by 90° relative to each other, the two outputs of each pair being mutually displaced by 180°, and that at the beginning of the operation the start of the first mark pulse will automatically coincide as to voltage and sign of gradient with the end of the last preceding space pulse of the shorter wavelength or vice versa. The flip-flop type bistable circuit A1 is controlled by mark pulses in line 41 and, as in the case of FIGURE 1, alternately makes available one or the other of the opposite phase outputs of generator E1, but flip-flop bistable circuit B1 which controls the selection of output from the 750 cycles-per-second oscillator F1, is fed from the space-pulse line 42 via a gate G which, by means of an input-controlled bistable circuit H and a delay member J prevents, after each mark pulse, the next-following space pulse from reaching the flip-flop circuit B1. Furthermore, since a single signal period in this example corresponds to only one quarter of a cycle of the 750 c./s. generator, each change of condition of the circuit B1 corresponds to a transfer from one pair of outputs of the generator F1 to the other pair, which is displaced relative to the first one by 90°. A further flip-flop K or L is interposed in each case to alternate between the two outputs of each pair which are mutually displaced by 180°. The choice between the thus selected output 12 of the 750 c./s. osciallator and the selected-polarity output 5 of 1500 c./s. generator E1 is effected, similarly to the case of FIGURE 1, by an input controlled bistable circuit C1, the input to which again is derived from the space-pulse input line 42 via the gate G to prevent the transmission of the "dummy" space pulse transmitted in each case at the end of the first basic signal period after the commencement of a mark signal.

Advantages of the described digital transmission circuits can be summarised thus:

(i) A phase-locked signal is produced, which lowers the error rate.

(ii) A narrow band signal is produced which is therefore less sensitive to delay distortion in the transmission medium.

(iii) The systems described use switching circuits only to produce a narrow band signal and no LC filters with their inherent delay distortion.

What I claim is:

1. In apparatus for the transmission of digital information by the selective alternative transmission of two signal frequencies over consecutive equal signal-pulse periods, the combination of means ensuring that at the moment of termination transmission of one signal and the simultaneous commencement of the transmission of another signal represented by a different frequency, the gradient of the voltage wave-forms of the two signals at the point of transition are substantially equal, wherein the higher of two signal frequencies employed is only one half and the lower is one quarter of the pulse-period frequency, means being provided for suppressing the emission of a further pulse at the end of the first pulse period following the emission of each pulse corresponding to the lower frequency, so that each signal comprises one full half-cycle of the appropriate signal frequency, the oscillator producing the lower frequency having four outputs, so that at the end of each signal period of the higher frequency one of the outlets will be available to supply a signal which begins at substantially the same gradient as to magnitude and sign at which the previous signal terminates.

2. In apparatus, for the selective alternative transmission of digital information by means of two frequency-shift signal frequencies of a carrier wave form over consecutive equal signal-pulse periods each initiated by the reception of an input pulse on one or the other of two input lines, the combination comprising a first sine-wave generator to which all input pulses are fed and which operates at the pulse-period frequency and providing two outputs in mutual anti-phase, a second sine-wave generator phase-locked to the first generator, which operates at one half of the pulse-period frequency, and which also produces two outputs in mutual anti-phase, an input-controlled bi-stable unit arranged to select one or the other of the sine-wave generators for the supply of a signal to the output element according to the digit to be transmitted, and two bi-stable devices each controlling a gating device, one of said bi-stable devices being operated by the input pulses in one and the other being operated by the input pulses in the other of the two input lines to each select alternately one and the other of the two outputs of that sine-wave generator which is connected to the output element by the reception of a signal pulse on the other input line the input-controlled bistable unit being arranged to effect each change-over at a point at which the gradients and momentary values of the respective sine-wave outputs are substantially equal.

3. Apparatus as claimed in claim 2, wherein the two outputs of each of said bi-stable devices are also each applied according to their polarity to control the second sine-wave generator.

4. In apparatus, for the selective alternative transmission of digital information by means of two frequency-shift signal frequencies of a carrier wave form within consecutive equal signal-pulse periods each initiated by the reception of an input pulse on one or the other of two input lines, the combination comprising a transmitter output element, at least two continuously operating sine-wave generators, whose sine-wave outputs are harmonically related and mutually phased locked, and signal generating means operative to selectively admit one or the other of said sine-wave outputs to said output element according to the digit to be transmitted, and to effect each change-over at a point at which the gradients and momentary values of the respective sine-wave outputs are substantially equal, wherein the higher of the two signal frequencies employed is only one half and the lower is one quarter of the pulse-period frequency, means being provided for suppressing the emission of a further pulse at the end of the first pulse period following the emission of each pulse corresponding to the lower frequencies, so that each signal comprises one full half-cycle of the appropriate signal frequency, the second sine-wave generator giving four outputs mutually phase-displaced by 90 degrees.

5. In apparatus for the selective alternative transmission of digital information by means of two frequency-shift signal frequencies of a carrier frequency within consecutive equal signal-pulse periods, the combination comprising a transmitter output element, at least two continuously operating sine-wave generators whose sine-wave outputs are harmonically related and mutually phased-locked, and signal-generating means operative to selectively admit one or the other of said sine-wave outputs to said output element according to the digit to be transmitted and to effect each change-over at a point at which the gradients and momentary values of the respective sine-wave outputs are substantially equal, wherein one of the two phase-locked sine-wave generators operates at one half and the other at one quarter of the pulse-period frequency, means being provided for suppressing the emission of a further pulse at the end of the first pulse period following the emission of each pulse corresponding to the lower frequency, so that each signal comprises one full half-cycle of the appropriate signal frequency, the oscillator producing the lower frequency having four outputs, so that at the end of each signal period of the higher frequency one of the outlets will be available to supply a signal which begins at substantially the same gradient as to magnitude and sign at which the previous signal terminates.

References Cited by the Examiner

UNITED STATES PATENTS

| | | | |
|---|---|---|---|
| 2,879,387 | 3/59 | Kahn | 325—163 |
| 3,102,238 | 8/63 | Bosen | 178—66 |

DAVID G. REDINBAUGH, *Primary Examiner.*